(12) United States Patent
Wang et al.

(10) Patent No.: US 8,261,168 B2
(45) Date of Patent: Sep. 4, 2012

(54) CODE COMBINING SOFT HANDOFF IN WIRELESS COMMUNICATION SYSTEM

(75) Inventors: Shu Wang, San Diego, CA (US); Byung Kwan Yi, San Diego, CA (US); Sang Gook Kim, San Diego, CA (US); Soon Yil Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 897 days.

(21) Appl. No.: 12/211,763

(22) Filed: Sep. 16, 2008

(65) Prior Publication Data

US 2009/0077450 A1 Mar. 19, 2009

Related U.S. Application Data

(60) Provisional application No. 60/972,860, filed on Sep. 17, 2007, provisional application No. 61/014,643, filed on Dec. 18, 2007.

(51) Int. Cl.
*H03M 13/03* (2006.01)

(52) U.S. Cl. ...................................................... 714/790

(58) Field of Classification Search .................. 714/790
See application file for complete search history.

(56) References Cited

U.S. PATENT DOCUMENTS

| | | | | |
|---|---|---|---|---|
| 5,640,414 A | * | 6/1997 | Blakeney et al. | 375/130 |
| 6,094,427 A | * | 7/2000 | Yi | 370/331 |
| 6,430,722 B1 | * | 8/2002 | Eroz et al. | 714/755 |
| 6,704,299 B1 | | 3/2004 | Li et al. | |
| 7,536,624 B2 | * | 5/2009 | Eroz et al. | 714/755 |
| 7,814,399 B2 | * | 10/2010 | Lundby | 714/790 |
| 2002/0004397 A1 | * | 1/2002 | Lee et al. | 455/442 |
| 2005/0204269 A1 | * | 9/2005 | Shoemake | 714/790 |
| 2006/0114910 A1 | * | 6/2006 | Sindhushayana et al. | 370/394 |
| 2006/0256708 A1 | * | 11/2006 | Wang et al. | 370/206 |
| 2007/0014251 A1 | * | 1/2007 | Jabri et al. | 370/310 |
| 2007/0183432 A1 | * | 8/2007 | Kim et al. | 370/400 |
| 2008/0016425 A1 | * | 1/2008 | Khan et al. | 714/755 |
| 2008/0101492 A1 | * | 5/2008 | Gregoire et al. | 375/267 |
| 2009/0319845 A1 | * | 12/2009 | Liu et al. | 714/747 |

* cited by examiner

*Primary Examiner* — Joshua Lohn
(74) *Attorney, Agent, or Firm* — Lee, Hong, Degerman, Kang & Waimey

(57) ABSTRACT

The present invention relates to a method for transmitting a signal in a wireless communication system. The method includes channel coding a data stream using a first turbo encoded puncture pattern, and channel coding the data stream using a second turbo encoded puncture pattern. Preferably, the first turbo encoded puncture pattern is a turbo encoded puncture pattern of a first local operator infrastructure (LOI) and the second turbo encoded puncture pattern is a turbo encoded puncture pattern of a second LOI that neighbors the first LOI.

24 Claims, 14 Drawing Sheets

FIG. 13

| Output | Code Rate | | |
|---|---|---|---|
| | 1/2 | 1/3 | 2/3 |
| X | 11 | 11 | 1111 |
| $Y_0$ | 10 | 11 | 1000 |
| $Y_1$ | 00 | 00 | 0000 |
| X' | 00 | 00 | 0000 |
| $Y'_0$ | 01 | 11 | 0001 |
| $Y'_1$ | 00 | 00 | 0000 |

FIG. 14

| Output | Code Rate | | |
|---|---|---|---|
| | 1/2 | 1/3 | 2/3 |
| X | 111 000 | 111 000 | 111 000 |
| $Y_0$ | 111 000 | 111 000 | 101 000 |
| $Y_1$ | 000 000 | 000 000 | 000 000 |
| X' | 000 111 | 000 111 | 000 111 |
| $Y'_0$ | 000 111 | 000 111 | 000 010 |
| $Y'_1$ | 000 000 | 000 000 | 000 000 |

FIG. 15

| Output | Code Rate | | |
|---|---|---|---|
| | 1/2 | 1/3 | 2/3 |
| X | 11 | 11 | 1111 |
| $Y_0$ | 10 | 11 | 1000 |
| $Y_1$ | 00 | 00 | 0000 |
| X' | 00 | 00 | 0000 |
| $Y'_0$ | 01 | 11 | 0001 |
| $Y'_1$ | 00 | 00 | 0000 |

| Output | Code Rate | | |
|---|---|---|---|
| | 1/2 | 1/3 | 2/3 |
| X | 111 000 | 111 000 | 111 000 |
| $Y_0$ | 111 000 | 111 000 | 101 000 |
| $Y_1$ | 000 000 | 000 000 | 000 000 |
| X' | 000 111 | 000 111 | 000 111 |
| $Y'_0$ | 000 111 | 000 111 | 000 010 |
| $Y'_1$ | 000 000 | 000 000 | 000 000 |

FIG. 16

|  | Code Rate | | |
|---|---|---|---|
| Output | 1/2 | 1/3 | 2/3 |
| X | 00 | 00 | 0000 |
| $Y_0$ | 01 | 11 | 0001 |
| $Y_1$ | 00 | 00 | 0000 |
| X' | 11 | 11 | 1111 |
| $Y'_0$ | 10 | 11 | 1000 |
| $Y'_1$ | 00 | 00 | 0000 |

|  | Code Rate | | |
|---|---|---|---|
| Output | 1/2 | 1/3 | 2/3 |
| X | 000 111 | 000 111 | 000 111 |
| $Y_0$ | 000 111 | 000 111 | 000 101 |
| $Y_1$ | 000 000 | 000 000 | 000 000 |
| X' | 111 000 | 111 000 | 111 000 |
| $Y'_0$ | 111 000 | 111 000 | 101 000 |
| $Y'_1$ | 000 000 | 000 000 | 000 000 |

CODE COMBINING SOFT HANDOFF IN WIRELESS COMMUNICATION SYSTEM

CROSS-REFERENCE TO RELATED APPLICATIONS

Pursuant to 35 U.S.C. §119, this application claims the benefit of earlier filing date and right of priority to U.S. Provisional Application No. 60/972,860, filed on Sep. 17, 2007 and U.S. Provisional Application No. 61/014,643, filed on Dec. 18, 2007, the contents of which are hereby incorporated by reference herein in their entirety.

FIELD OF THE INVENTION

The present invention relates to a code combining soft handoff (CCSH) method in a wireless communication system.

BACKGROUND OF THE INVENTION

In mobile communications, a handoff is an automatic switchover of the current traffic channel that occurs when a mobile terminal moves from one cell to another cell. Such a handoff is typically classified into a hard handoff and a soft handoff. The hard handoff first breaks the existing communication channel before opening a new traffic channel, whereas the soft handoff first connects the new channel and then breaks the existing channel.

In other words, according to the hard handoff procedure, when a mobile communication terminal (i.e., mobile station) moves from one base station to another base station, the channel connected to the existing base station is released, and a new channel of the new base station is then connected. According to the soft handoff procedure, which is a handoff between cells, when a mobile communication terminal (i.e., mobile station) comes near another cell region having the same frequency while the mobile terminal is in use, the mobile terminal detects and informs the current cell that the signal strength of the pilot signal of a new cell is sufficiently high. The new cell then opens a traffic channel for the mobile terminal with the new base station. At this time, the mobile terminal simultaneously maintains communication through the traffic channels of the two cells.

As the mobile terminal approaches the new cell, the signal of the previous cell becomes weaker. If the strength of this previous signal is lower than a predetermined level, the mobile terminal informs the two cells of this fact, and the previous cell breaks the communication channel through the mobile station. The mobile terminal thus continues the call through the new cell having a stronger signal state.

A softer handoff is a handoff between different sectors of one cell. According to the softer handoff, one cell is divided into several sectors, and when the mobile terminal in use moves from one sector to another sector within the same base station, the traffic channel is connected in the same manner as the soft handoff.

Meanwhile, a high-speed data transmitting system may use a code combining soft handoff (CCSH) method using turbo coding. According to the CCSH, one signal is encoded by different coding methods, and resultant coded signals are transmitted. A receiving part decodes and combines the signals encoded by the different coding methods to obtain a gain. According to the CCSH handoff method, several base stations transmit the signals encoded by different coding methods from the various base stations and a mobile terminal receives and combines the signals encoded by the different coding methods to obtain the gain. If the mobile terminal receives the signals encoded by the same coding method, however, it obtains no gain.

For example, as shown in FIG. 1, data to be transmitted to a base station is outputted from a master switch center 101 of a base station controller. The data is then inputted to a turbo encoder 101b, which encodes the data. The turbo encoder 101b then outputs two signals encoded with different patterns.

The two signals are transmitted to the respective base stations with pilot signals from respective pilot channel sections 102a and 102b included therein. The transmitted signals are then received by the mobile terminal from each of the respective base stations. The mobile terminal decodes and combines the two signals encoded with different patterns to obtain the gain.

Meanwhile, according to the CCSH handoff method, the respective base station is allocated with a PN number for discrimination among base stations and cell regions that transmit/receive signals to/from the mobile terminal. In transmitting/receiving the signals to/from the mobile terminal, the respective base stations are under the control of the base station controller, and have different code patterns.

CCSH is a scheme for achieving both coding gain and diversity gain, and has been adopted in a cdma2000 standard for a code division multiple access (CDMA) network. Accordingly, there is a need to apply CCSH to other types of communication technologies to achieve higher gain.

SUMMARY OF THE INVENTION

The present invention is directed to transmitting a signal in a wireless communication system utilizing code combining soft handoff technology.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a system and method for transmitting a signal in a wireless communication system. The present invention comprises channel coding a data stream using a first turbo encoded puncture pattern, and channel coding the data stream using a second turbo encoded puncture pattern. Preferably, the first turbo encoded puncture pattern is a turbo encoded puncture pattern of a first local operator infrastructure (LOI) and the second turbo encoded puncture pattern is a turbo encoded puncture pattern of a second LOI that neighbors the first LOI.

In one aspect of the invention, the data stream is differentiated into at least a first layer data stream and a second layer data stream, wherein the first layer data stream is channel coded using the first turbo encoded puncture pattern and the second turbo encoded puncture pattern, and the second layer data stream is channel coded using the first turbo encoded puncture pattern and the second turbo encoded puncture pattern.

Preferably, the first layer is an enhancement layer and the second layer is a base layer. Preferably, the first LOI and the second LOI broadcast the same data stream at the same time and the same logical channel.

In another aspect of the invention, the first LOI transmits the first layer data stream and the second layer data stream channel coded using the first turbo encoded puncture pattern. Moreover, the second LOI transmits the first layer data stream and the second layer data stream channel coded using the second turbo encoded puncture pattern.

Preferably, the data stream includes a flow description message comprising a transmit mode extension field. Alternatively, the data stream is transmitted along with a flow description message comprising a transmit mode extension field.

Preferably, the data stream includes a system parameters message comprising a control channel transmit mode extension field. Alternatively, the data stream is transmitted along with a system parameters message comprising a control channel transmit mode extension field.

Preferably, transmit modes for transmitting the data stream comprise 16-QAM modulation and a turbo code rate of 1/3, QPSK modulation and a turbo code rate of 1/5, layered modulation with energy ratio 4 and a turbo code rate of 1/3, and layered modulation with energy ratio 6.25 and a turbo code rate of 1/3.

Preferably, transmit modes related to a second turbo encoded puncture pattern for transmitting the data stream comprise, QPSK modulation and a turbo code rate of 1/3, QPSK modulation and a turbo code rate of 1/2, 16-QAM modulation and a turbo code rate of 1/3, 16-QAM modulation and a turbo code rate of 1/2, 16-QAM modulation and a turbo code rate of 2/3, QPSK modulation and a turbo code rate of 1/5, layered modulation with energy ratio 4 and a turbo code rate of 1/3, layered modulation with energy ratio 4 and a turbo code rate of 1/2, layered modulation with energy ratio 4 and a turbo code rate of 2/3, layered modulation with energy ratio 6.25 and a turbo code rate of 1/3, layered modulation with energy ratio 6.25 and a turbo code rate of 1/2, and layered modulation with energy ratio 6.25 and a turbo code rate of 2/3.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIGS. 13 and 14 illustrate puncture patterns employed by the turbo encoder of FIG. 12 for generating turbo-encoded bit sequences in accordance with one embodiment of the present invention.

FIG. 15 illustrates an example of a first of two puncture patterns used in accordance with one embodiment of the present invention.

FIG. 16 illustrates an example of a second of two puncture patterns used in accordance with one embodiment of the present invention.

DETAILED DESCRIPTION OF THE PREFERRED EMBODIMENTS

The present invention relates to transmitting a signal in a wireless communication system utilizing code combining soft handoff technology.

In accordance with one embodiment of the present invention, a code combining soft handoff (CCSH) method is applied to an orthogonal frequency division multiplexing (OFDM) system. For mobile communication systems based on OFDM, challenges have previously existed for directly applying CCSH, perhaps due to the high channel estimation requirement of OFDM. The present invention overcomes these challenges by providing methods for multiplexing traffic channels and pilot channels in order to apply CCSH on OFDM systems. Though the invention is described with reference to OFDM, the present invention may also be applied to other multiplexing schemes, such as frequency division multiplexing (FDM), multi-carrier code division multiplexing (MC-CDM), single-carrier frequency division multiplexing (SC-FDM) and interleaved frequency division multiplexing (IFDM), for example.

Figure 1:
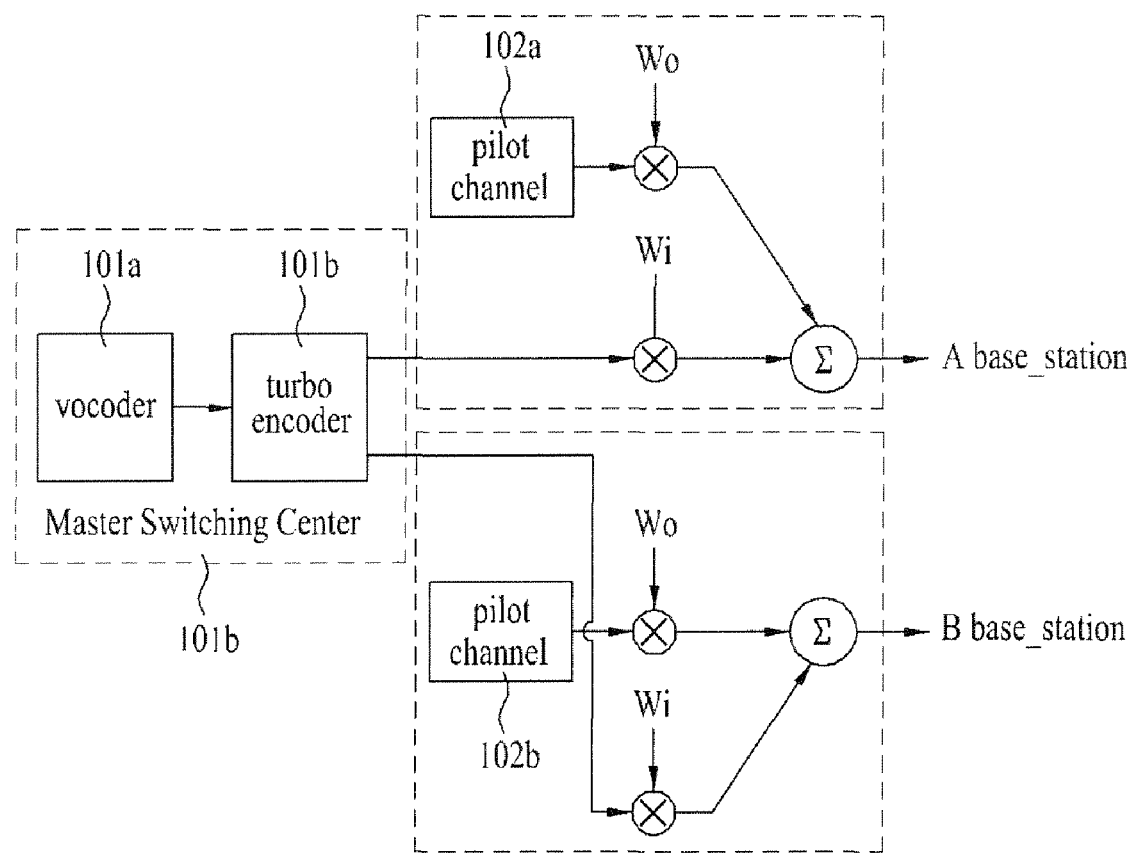
FIG. 1 is a block diagram of a transmission part facilitating a code combining soft handoff method.
Figure 2:
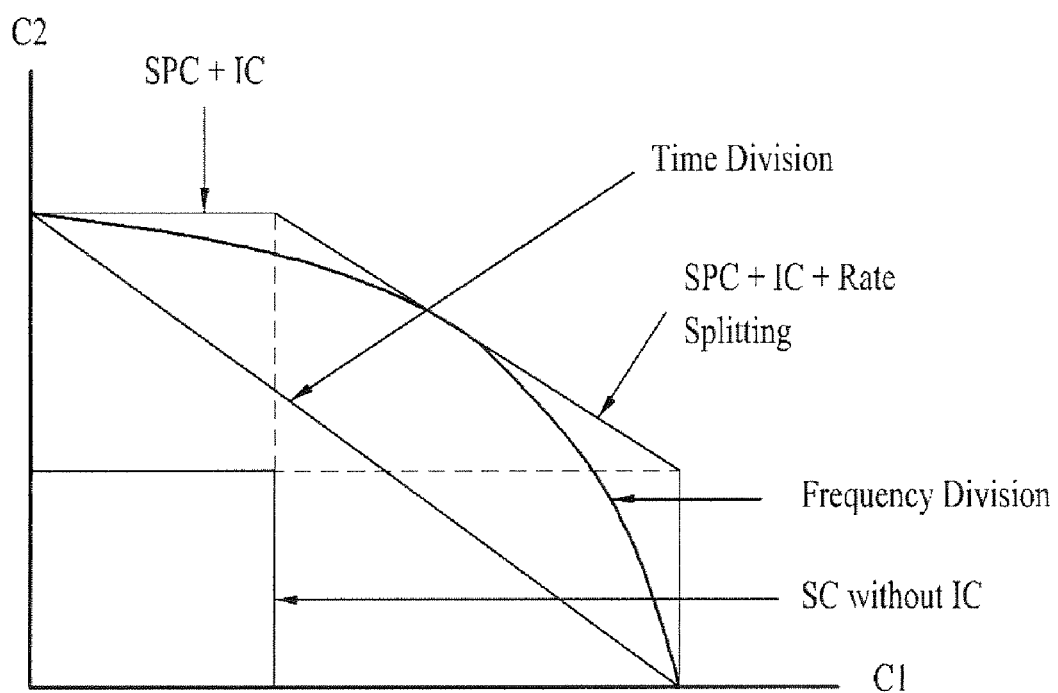
FIG. 2 illustrates a graph for determining a multi-access channel capacity in accordance with one embodiment of the present invention.

FIG. 2 illustrates a graph for determining a multi-access channel capacity in accordance with one embodiment of the present invention. Referring to FIG. 2, for a medium access control (MAC) channel, an optimal access strategy for a transmitting side is to spread a signal across an entire bandwidth. For a receiving side, the optimal access strategy is to maximize interference cancellation. Accordingly, this strategy may be applied to a soft handoff scenario as well.

Figure 3:
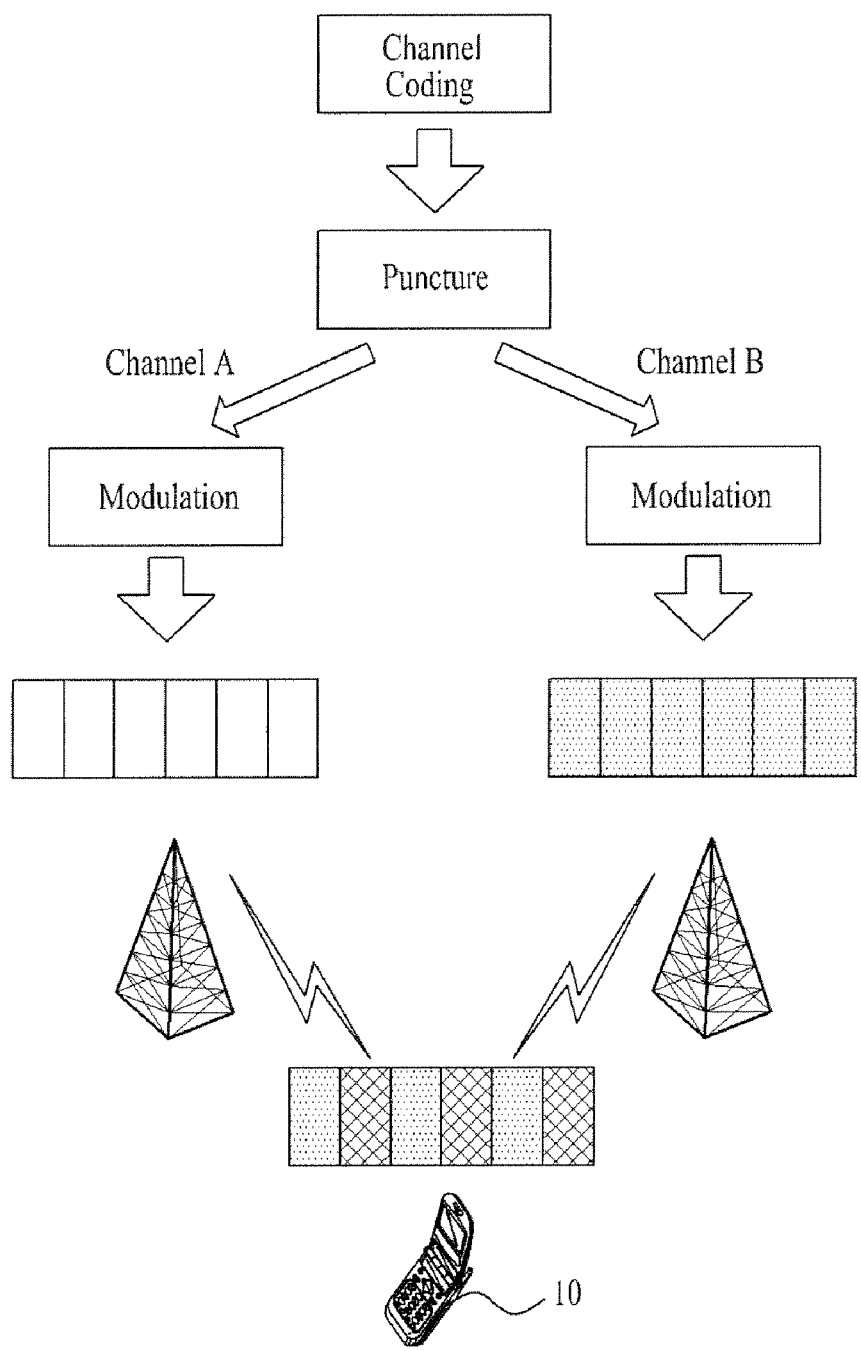
FIG. 3 illustrates a combined coding soft handoff (CCSH) architecture in accordance with one embodiment of the present invention.

FIG. 3 illustrates a combined coding soft handoff (CCSH) architecture in accordance with one embodiment of the present invention. Referring to FIG. 3, in complementary CCSH, one channel coded data stream is complementarily divided and transmitted through two independent channels (A and B). After demodulation, a receiver 10 will combine the signals and perform channel decoding.

As stated above, CCSH has been applied to a CDMA network. Therefore, when applying CCSH to an OFDM system, the present invention considers differences between CDMA and OFDM. For example, CDMA requires relatively simple channel estimation. Thus, one pilot sequence for each link may be enough. However, QFDM expects more accurate channel tracking. Accordingly, in OFDM, multiple pilot subcarriers are preferred.

A method for applying CCSH on and OFDM transmission provides how to place pilot channels and traffic channels from within a cell, and how to schedule pilot/traffic channels between cells. Referring to Table (1) and FIGS. 4-7, four approaches are described.

(1)

|  | Pilot and Traffic Channels Within the Cell (Same BS) | Between cells (BSs) | |
|---|---|---|---|
|  |  | Pilot Channels | Traffic Channels |
| Orthogonal | Approach I<br>Approach III<br>Approach IV | Approach I<br>Approach II<br>Approach III | Approach I<br>Approach II |
| Nonorthogonal | Approach II (SIP) | Approach IV (CMP) | Approach III<br>Approach IV (Overlapped) |

Figure 4:
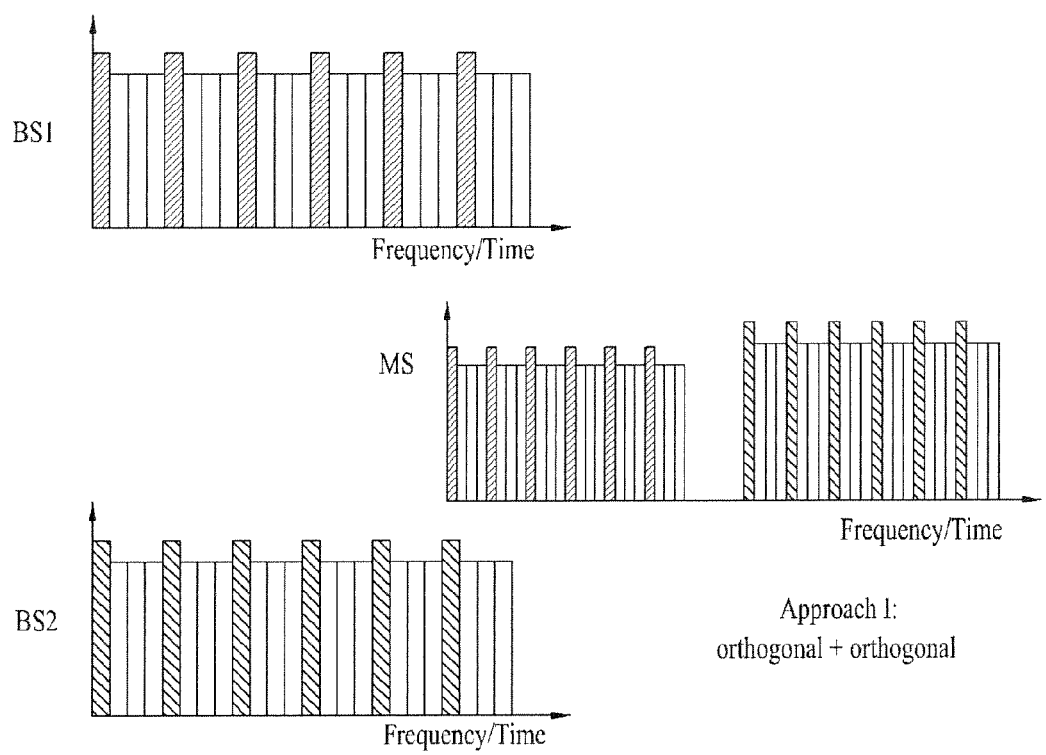
FIG. 4 illustrates a first approach for applying CCSH on an OFDM system in accordance with one embodiment of the present invention.

Referring to FIG. 4, in Approach I, from the same base station (BS), pilot channels and traffic channels are orthogonal, Between BSs, pilot channels and traffic channels are orthogonal.

Figure 5:
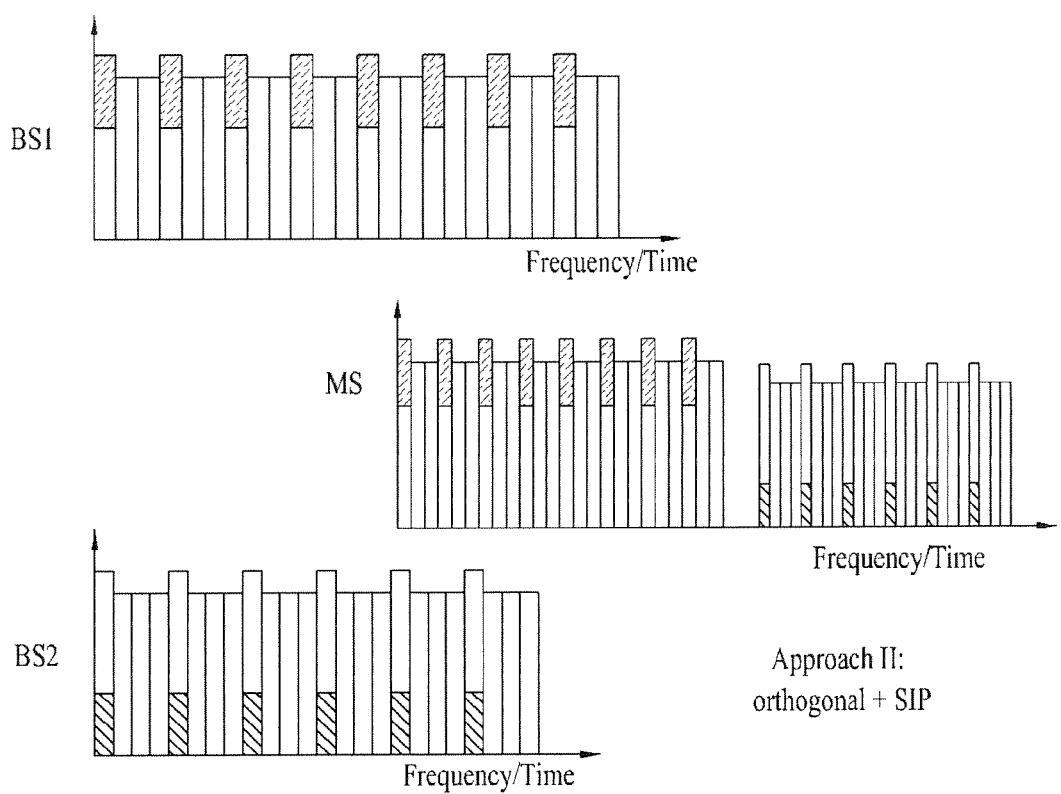
FIG. 5 illustrates a second approach for applying CCSH on an OFDM system in accordance with one embodiment of the present invention.

Referring to FIG. 5, in Appproach II, from the same BS, a session initiation protocol (SIP) is applied to pilot channels and traffic channels. Between BSs, channels for which an SIP has been applied are orthogonal to each other.

Figure 6:
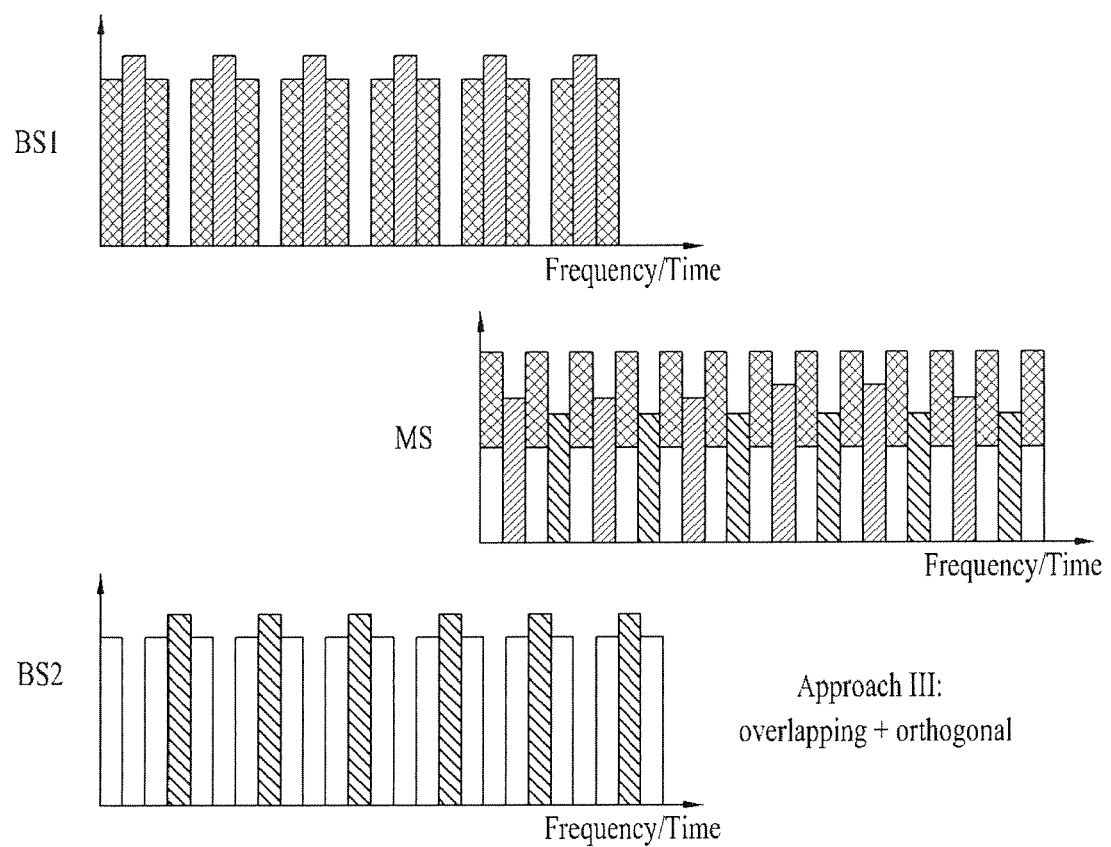
FIG. 6 illustrates a third approach for applying CCSH on an OFDM system in accordance with one embodiment of the present invention.

Referring to FIG. 6, in Approach III, from the same BS, pilot channels and traffic channels are orthogonal. Between BSs, pilot channels are orthogonal but traffic channels are overlapped.

Figure 7:
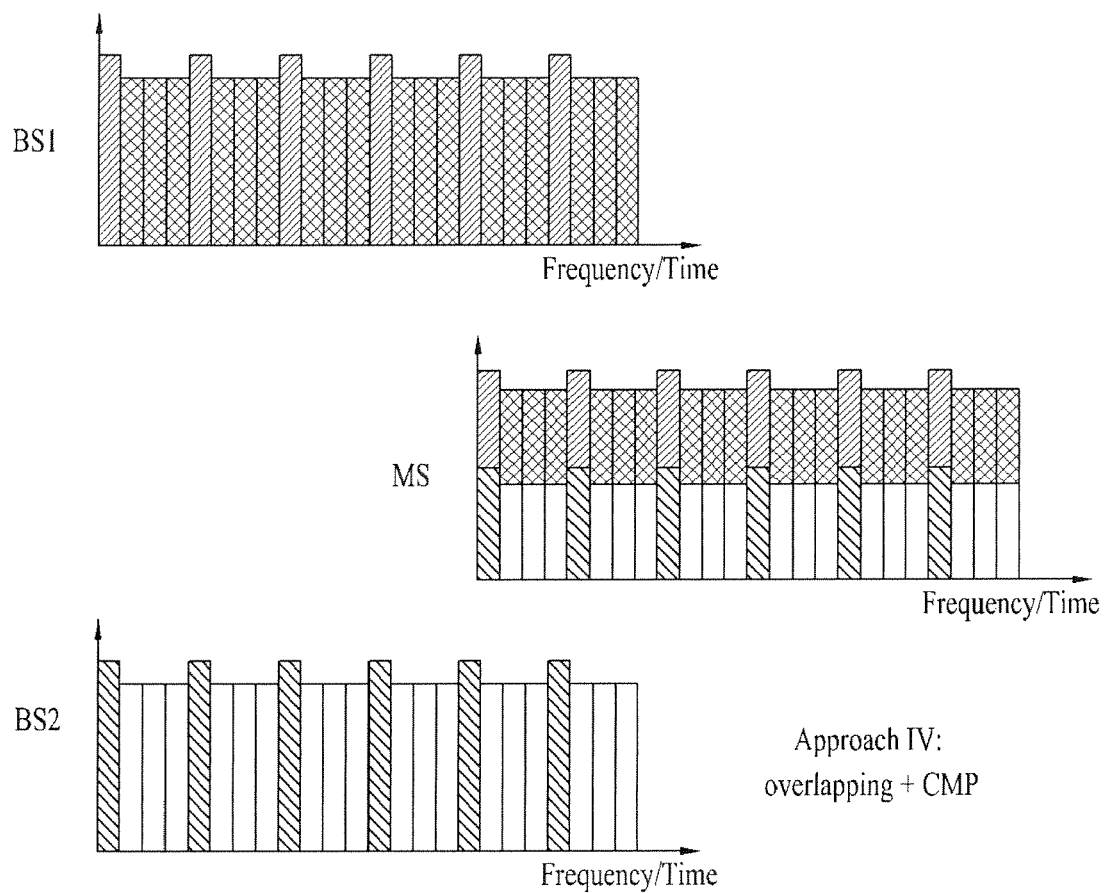
FIG. 7 illustrates a fourth approach for applying CCSH on an OFDM system in accordance with one embodiment of the present invention.

Referring to FIG. 7, in Approach IV, from the same BS, pilot channels and traffic channels are orthogonal. Between BSs, a certificate management protocol (CMP) is applied to pilot channels and traffic channels are overlapped. A summary of the four approaches is found in Table (1). Notably, the present invention is not limited to the four approaches identified. Other approaches using SIP, CMP, overlapping, orthogonal approaches and traffic/pilot channels may also be implemented.

Table (2) summarizes characteristics of the four approaches. As shown in Table (2), orthogonal multiplexing approaches, such as TDM/FDM/OFDM, provide low receiver complexity and low spectral efficiency. Nonorthogonal multiplexing approaches, such SIP and CMP, provide high receiver complexity and high spectral efficiency.

placed to complementarily overlap pilots of other transmitters in both a time and frequency domain. Preferably, there is a rotation between the pilot patterns for different antennas. However, the pilot patterns are not orthogonal to each other in general.

Figure 10:
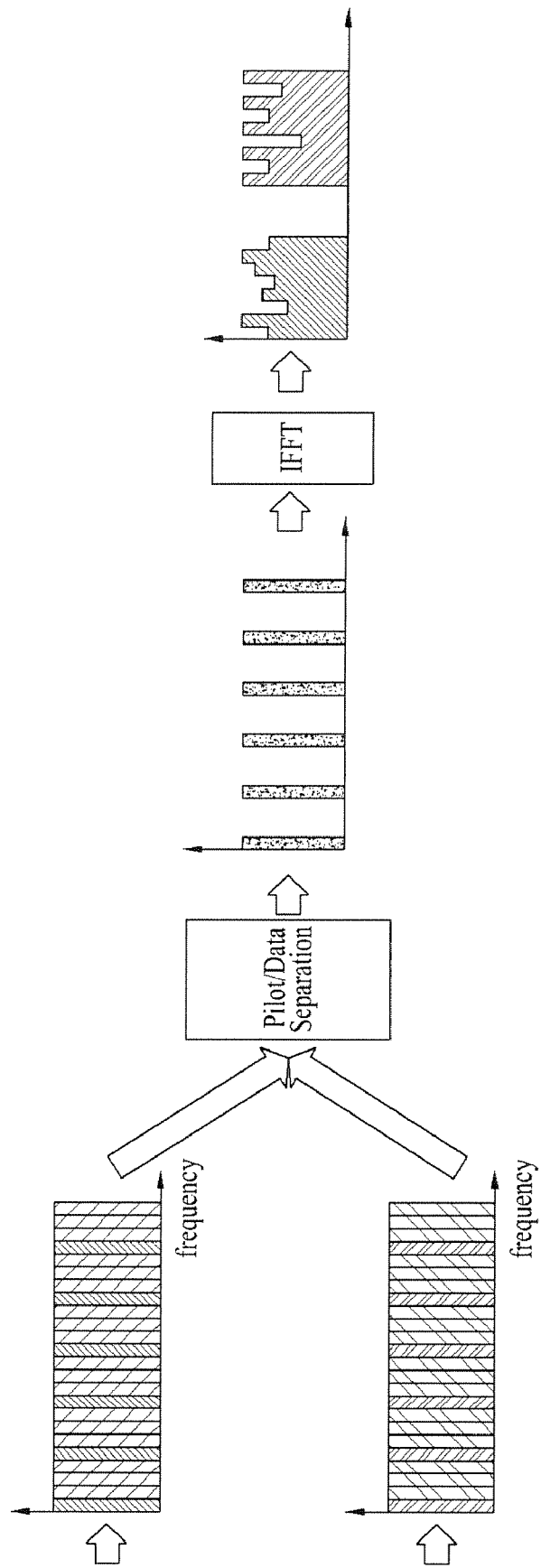

Referring to FIG. 10, when a mobile terminal receives pilot signals from multiple cells, the pilot signals are overlapped with each other in both the time and frequency domain. If each link channel response is not long, the pilot signals can be separated and estimated in the time domain using a Fast Fourier Transform (FFT) or Inverse Fast Fourier Transform (IFFT).

In order to control the delay or rotation of each pilot channel, two methods are preferred. First, with location based services (LBS) data, the network can estimate the delay or the delay difference between each mobile terminal and each of nearby cells. Second, with a time advance request, the involved mobile terminal can estimate the propagation delay and feed back the timing difference to the network.

In accordance with another embodiment of the present invention, when a mobile terminal communicates with multiple base stations (BSs), the mobile terminal is considered to be in a soft handoff region. If two or more BSs are working in the same frequency with the same content, the BSs comprise a single frequency network (SFN). If the BSs are in different frequencies, the network is considered to be a multi-frequency network (MFN).

In a SFN, the mobile terminal may have soft handoff diversity gain because multiple BSs send multiple same signals at the same time. However, in a MFN, soft handoff diversity may not exist because BSs transmit over multiple different frequencies, and the mobile terminal can only access one BS at a time.

Figure 11:
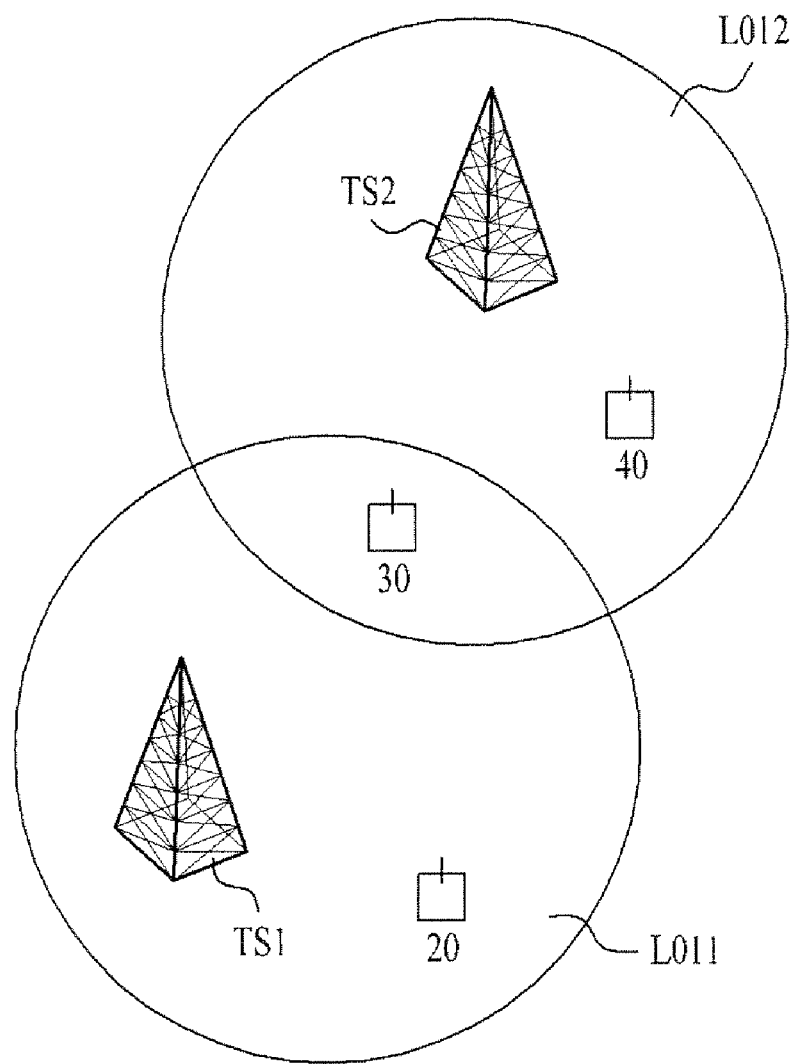
FIG. 11 illustrates a multi-frequency network (MFN) in accordance with one embodiment of the present invention.

FIG. 11 illustrates a multi-frequency network (MFN) in accordance with one embodiment of the present invention. Referring to FIG. 11, a mobile terminal 20 and base station TS1 are located in a local operator infrastructure 1 (LOI1). A mobile terminal 40 and a base station TS2 are located in a local operator infrastructure 2 (LOI2). A mobile terminal 30 is located in both the LOI1 and LOI2. Preferably, a code combining soft handoff (CCSH) method is implemented for achieving more diversity gain and coding gain for mobile terminals in the MFN soft handoff region.

(2)

| Approach | Pilot/Traffic Channel Within the Cell (Same BS) | Pilot Channels Between Cells (BSs) | Traffic Channels Between Cells (BSs) | Performance | | |
|---|---|---|---|---|---|---|
|  |  |  |  | Spectral Efficiency | Chan. Esti. Complexity | Demod. Complexity |
| I | TDM/FDM/OFDM | TDM/FDM/OFDM | TDM/FDM/OFDM | Low | Low | Low |
| II | SIP | TDM/FDM/OFDM | TDM/FDM/OFDM | Middle | High | Middle |
| III | TDM/FDM/OFDM | TDM/FDM/OFDM | Overlapped | High | Low | High |
| IV | TDM/FDM/OFDM | CMP | Overlapped | Highest | Middle | High |

Figure 8:
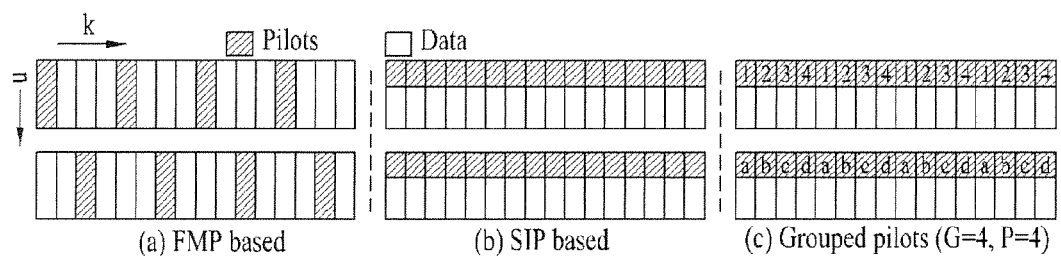
FIG. 8 illustrates a superimposed pilot design in accordance with one embodiment of the present invention.
Figure 9:
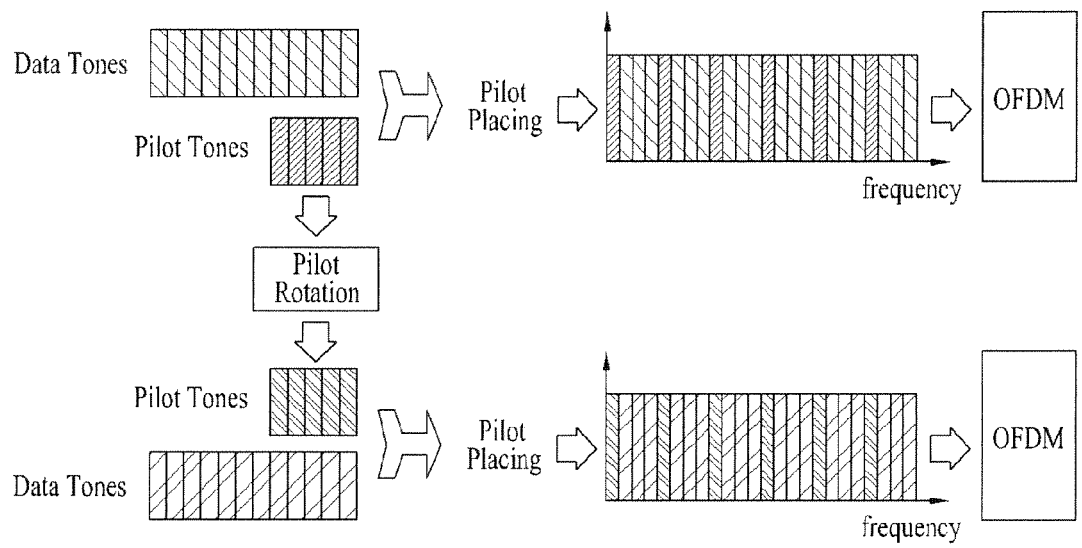
FIGS. 9 and 10 illustrate a method for complementarily multiplexing pilots in accordance with one embodiment of the present invention.
Figure 12:
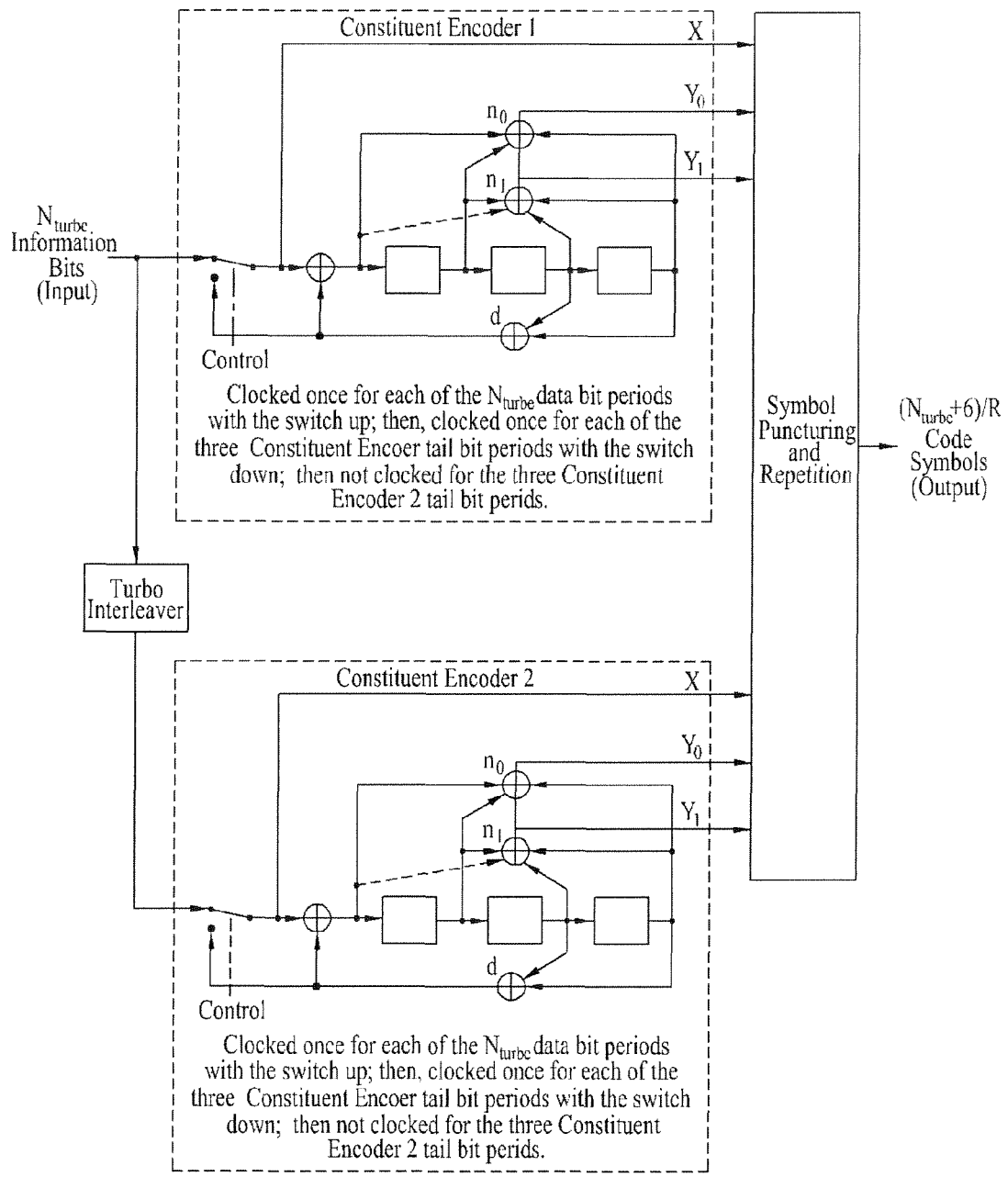
FIG. 12 illustrates a turbo encoder structure in accordance with one embodiment of the present invention.

FIG. 8 illustrates a superimposed pilot design in accordance with one embodiment of the present invention. FIGS. 9 and 10 illustrate a method for complementarily multiplexing pilots in accordance with one embodiment of the present invention. Referring to FIG. 9, a pilot for a transmitter is FIG. 12 illustrates a turbo encoder structure in accordance with one embodiment of the present invention. FIGS. 13 and 14 illustrate puncture patterns employed by the turbo encoder of FIG. 12 for generating turbo-encoded bit sequences in accordance with one embodiment of the present invention.

Referring to FIG. 13, puncture patterns for data bit periods are organized in a table. Preferably, the puncture table is read from top to bottom.

Referring to FIG. 14, puncture patterns for tail bit periods are organized in a table. Preferably, for rate-1/2 turbo codes, the puncturing table is read from top to bottom, and then from left to right. For rate-1/3 turbo codes, the puncturing table is read from top to bottom repeating X and X', and then from left to right. For rate-2/3 turbo codes, the puncturing table is read from top to bottom, and then from left to right.

In a multi-frequency network (MFN), two adjacent LOIs, such as LOI1 and LOI2 in FIG. 11, are operated with different carrier frequencies. Accordingly, the local area content of each LOI may be different in either the time domain or frequency domain. However, the two LOIs may share the same wide-area content in both the time and frequency domains, such as when the mobile terminal 30 of FIG. 11 is located in both LOI1 and LOI2.

Therefore, in accordance with one embodiment of the present invention, when the neighboring LOIs broadcast the same content at the same time and the same logical channel (MLC), two different turbo encoding puncture patterns may be used individually by a respective LOI to code a transmitted signal. This is preferred in order to provide forward link only (FLO) devices in handoff regions the chance to apply code combining soft handoff (CCSH). Furthermore, the present invention may aid FLO devices in handoff regions to obtain more coding gain in addition to frequency diversity gain.

In accordance with one embodiment of the present invention, a data stream is channel coded using a first turbo encoded puncture pattern of a first local operator infrastructure (LOI), and channel coded using a second turbo encoded puncture pattern of a second LOI that neighbors the first LOI. Preferably, the data stream is differentiated into at least a first layer data stream and a second layer data stream. For example, the first layer may be an enhancement layer, and the second layer may be a base layer.

Accordingly, the first layer data stream may be channel coded using the first turbo encoded puncture pattern and the second turbo encoded puncture pattern. Similarly, the second layer data stream may be channel coded using the first turbo encoded puncture pattern and the second turbo encoded puncture pattern. As a result, the first layer data stream and the second layer data stream channel coded using the first turbo encoded puncture pattern may be transmitted via the first LOI. Moreover, the first layer data stream and the second layer data stream channel coded using the second turbo encoded puncture pattern may be transmitted via the second LOI.

FIG. 15 illustrates an example of a first of two puncture patterns used in accordance with one embodiment of the present invention. Referring to FIG. 15, the puncturing tables of puncture pattern A are essentially the same as the puncturing tables of FIGS. 13 and 14. FIG. 16 illustrates an example of a second of two puncture patterns used in accordance with one embodiment of the present invention. Notably, a puncture pattern B of FIG. 16 may be the same as the puncture pattern A of FIG. 15. However, it is preferred that the puncture pattern B be different from, or complementary to, the puncture pattern A.

Table (3) below illustrates a transmit mode table used in conjunction with a FLO broadcasting system in accordance with one embodiment of the present invention.

(3)

| Mode Number | Modulation | Turbo Code Rate |
|---|---|---|
| 0 | QPSK | 1/3 |
| 1 | QPSK | 1/2 |
| 2 | 16-QAM | 1/3 |
| 3 | 16-QAM | 1/2 |
| 4 | 16-QAM | 2/3 |
| 5[34] | QPSK | 1/5 |
| 6 | Layered Modulation With Energy Ratio 4 | 1/3 |
| 7 | Layered Modulation With Energy Ratio 4 | 1/2 |
| 8 | Layered Modulation With Energy Ratio 4 | 2/3 |
| 9 | Layered Modulation With Energy Ratio 6.25 | 1/3 |
| 10 | Layered Modulation With Energy Ratio 6.25 | 1/2 |
| 11 | Layered Modulation With Energy Ratio 6.25 | 2/3 |
| 12 | 16-QAM | 1/3 |
| 13 | QPSK | 1/5 |
| 14 | Layered Modulation With Energy Ratio 4 | 1/3 |
| 15 | Layered Modulation With Energy Ratio 6.25 | 1/3 |

Table (4) below illustrates a transmit mode table used in conjunction with a FLO broadcasting system in accordance with another embodiment of the present invention. As shown, transmit modes for puncture patterns A and B are described.

(4)

| Mode Number | Modulation | Turbo Code Rate | Type |
|---|---|---|---|
| 0 | QPSK | 1/3 | A |
| 1 | QPSK | 1/2 | |
| 2 | 16-QAM | 1/3 | |
| 3 | 16-QAM | 1/2 | |
| 4 | 16-QAM | 2/3 | |
| 5[34] | QPSK | 1/5 | |
| 6 | Layered Modulation With Energy Ratio 4 | 1/3 | |
| 7 | Layered Modulation With Energy Ratio 4 | 1/2 | |
| 8 | Layered Modulation With Energy Ratio 4 | 2/3 | |
| 9 | Layered Modulation With Energy Ratio 6.25 | 1/3 | |
| 10 | Layered Modulation With Energy Ratio 6.25 | 1/2 | |
| 11 | Layered Modulation With Energy Ratio 6.25 | 2/3 | |
| 12 | QPSK | 1/3 | B |
| 13 | QPSK | 1/2 | |
| 14 | 16-QAM | 1/3 | |
| 15 | 16-QAM | 1/2 | |
| 16 | 16-QAM | 2/3 | |
| 17 | QPSK | 1/5 | |
| 18 | Layered Modulation With Energy Ratio 4 | 1/3 | |
| 19 | Layered Modulation With Energy Ratio 4 | 1/2 | |
| 20 | Layered Modulation With Energy Ratio 4 | 2/3 | |
| 21 | Layered Modulation With Energy Ratio 6.25 | 1/3 | |
| 22 | Layered Modulation With Energy Ratio 6.25 | 1/2 | |
| 23 | Layered Modulation With Energy Ratio 6.25 | 2/3 | |

Table (5) below illustrates a flow description message used in conjunction with a FLO broadcasting system in accordance with one embodiment of the present invention. Preferably, a TransmitMode parameter in the flow description message is set to not be greater than 4 bits.

(5)

| Field | Length (bits) |
|---|---|
| CPPHeader | 32 or 40 |
| FlowBlobLength | 8 |
| FlowCount | 7 |
| Reserved0 | 1 |

-continued (5)

| Field | Length (bits) |
|---|---|
| FlowCount occurrences of the remaining fields | |
| FlowID_bits_4_thru_19_SameAsBefore | 1 |
| FlowID_bits_4_thru_19 | 0 or 16 |
| FlowID_bits_0_thru_3 | 4 |
| RFChannelID | 8 |
| MLCIDSameAsBefore | 1 |
| MLC_ID | 0 or 8 |
| TransmitMode | 0 or 4 |
| OuterCodeRate | 0 or 4 |
| FlowBlob | FlowBlobLength |
| StreamID | 2 |
| StreamResidualErrorProcessing | 2 |
| StreamUsesBothComponents | 1 |
| Reserved1 | Variable (0-7) |

Table (6) below illustrates a system parameters message used in conjunction with a FLO broadcasting system in accordance with one embodiment of the present invention. Preferably, a ControlChannelTXMode parameter in the system parameters message is set to not be greater than 4 bits.

(6)

| Field | Length (bits) |
|---|---|
| SYS_TIME | 32 |
| LP_SEC | 8 |
| LTM_OFF | 6 |
| DAYLT | 1 |
| NetworkID | 16 |
| InfrastructureID | 16 |
| ProtocolVersion | 8 |
| MinProtocolVersion | 8 |
| MinMonitorCycleIndex | 4 |
| NumPPCSymbols | 2 |
| NumMACTimeUnits | 9 |
| DataMACTrailerLength | 4 |
| ControlMACHdrLength | 2 |
| StreamLayerTrailerLength | 4 |
| CPPHdrLength | 3 |
| ControlChannelTxMode | 4 |
| ControlChannelOuterCodeRate | 4 |
| ControlChannelAllocation | 3 |
| ControlChannelStartOffset | 9 |

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for transmitting a signal in a wireless communication system, the method comprising:
channel coding, by a first base station (BS), a data stream using a first turbo encoded puncture pattern to provide a first coded data stream; and
channel coding, by a second BS, the data stream using a second turbo encoded puncture pattern to provide a second coded data stream;
transmitting, by the first BS, the first coded data stream to a User Equipment (UE); and
transmitting, by the second BS, the second coded data stream to the UE,
wherein the first turbo encoded puncture pattern is a turbo encoded puncture pattern of the first BS and the second turbo encoded puncture pattern is a turbo encoded puncture pattern of the second BS that neighbors the first BS,
wherein the first turbo encoded puncture pattern for a data bit period is configured such that the first coded data stream comprises systematic symbols of the data stream and, based on a code rate, one or more redundancy symbols from a first constituent encoder and a second constituent encoder of a first turbo encoder,
wherein the second turbo encoded puncture pattern for the data bit period is configured such that the second coded data stream comprises interleaved systematic symbols of the data stream and, based on the code rate, one or more redundancy symbols from a first constituent encoder and a second constituent encoder of a second turbo encoder, the interleaved systematic symbols interleaved by an interleaver of the second turbo encoder,
wherein the second turbo encoded puncture pattern for the data bit period is according to the table

| | Code Rate | | |
|---|---|---|---|
| Output | 1/2 | 1/3 | 2/3 |
| X | 00 | 00 | 0000 |
| $Y_0$ | 01 | 11 | 0001 |
| $Y_1$ | 00 | 00 | 0000 |
| X' | 11 | 11 | 1111 |
| $Y_0'$ | 10 | 11 | 1000 |
| $Y_1'$ | 00 | 00 | 0000, | wherein the second turbo encoded puncture pattern for a tail bit period is according to the table

| | Code Rate | | |
|---|---|---|---|
| Output | 1/2 | 1/3 | 2/3 |
| X | 000 111 | 000 111 | 000 111 |
| $Y_0$ | 000 1111 | 000 111 | 000 101 |
| $Y_1$ | 000 000 | 000 000 | 000 000 |
| X' | 111 000 | 111 000 | 111 000 |
| $Y_0'$ | 111 000 | 111 000 | 101 000 |
| $Y_1'$ | 000 000 | 000 000 | 000 000, | wherein X, $Y_0$, $Y_1$, X', $Y_0'$ and $Y_1'$ denote outputs of the second turbo encoder for each bit period, X output first, and
wherein the first constituent encoder and the second constituent encoder of the second turbo encoder are clocked once for each data bit period and clocked once for each of three tail bit periods.

2. The method of claim 1, further comprising:
differentiating the data stream into at least a first layer data stream and a second layer data stream;
channel coding the first layer data stream using the first turbo encoded puncture pattern and the second turbo encoded puncture pattern; and
channel coding the second layer data stream using the first turbo encoded puncture pattern and the second turbo encoded puncture pattern.

3. The method of claim 2, wherein the first layer data stream is an enhancement layer data stream and the second layer data stream is a base layer data stream.

4. The method of claim 1, wherein the first BS and the second BS broadcast the same data stream at the same time and the same logical channel.

5. The method of claim 2, further comprising transmitting via the first BS the first layer data stream and the second layer data stream channel coded using the first turbo encoded puncture pattern.

6. The method of claim 2, further comprising transmitting via the second BS the first layer data stream and the second layer data stream channel coded using the second turbo encoded puncture pattern.

7. The method of claim 1, wherein the data stream includes a flow description message comprising a transmit mode extension field.

8. The method of claim 1, wherein the data stream is transmitted along with a flow description message comprising a transmit mode extension field.

9. The method of claim 1, wherein the data stream includes a system parameters message comprising a control channel transmit mode extension field.

10. The method of claim 1, wherein the data stream is transmitted along with a system parameters message comprising a control channel transmit mode extension field.

11. The method of claim 1, wherein transmit modes for transmitting the data stream comprise:
   16-QAM modulation and a turbo code rate of 1/3;
   QPSK modulation and a turbo code rate of 1/5;
   layered modulation with energy ratio 4 and a turbo code rate of 1/3; and
   layered modulation with energy ratio 6.25 and a turbo code rate of 1/3.

12. The method of claim 1, wherein transmit modes related to the second turbo encoded puncture pattern for transmitting the data stream comprise:
   QPSK modulation and a turbo code rate of 1/3;
   QPSK modulation and a turbo code rate of 1/2;
   16-QAM modulation and a turbo code rate of 1/3;
   16-QAM modulation and a turbo code rate of 1/2;
   16-QAM modulation and a turbo code rate of 2/3;
   QPSK modulation and a turbo code rate of 1/5;
   layered modulation with energy ratio 4 and a turbo code rate of 1/3;
   layered modulation with energy ratio 4 and a turbo code rate of 1/2;
   layered modulation with energy ratio 4 and a turbo code rate of 2/3;
   layered modulation with energy ratio 6.25 and a turbo code rate of 1/3;
   layered modulation with energy ratio 6.25 and a turbo code rate of 1/2; and
   layered modulation with energy ratio 6.25 and a turbo code rate of 2/3.

13. A system for transmitting a signal in a wireless communication system, the system comprising:
   a first base station (BS) for channel coding a data stream using a first turbo encoded puncture pattern to provide a first coded data stream; and
   a second BS that neighbors the first BS for channel coding the data stream using a second turbo encoded puncture pattern to provide a second coded data stream,
   wherein the first coded data stream is transmitted by the first BS to a User Equipment (UE),
   wherein the second coded data stream is transmitted by the second BS to the UE,
   wherein the first turbo encoded puncture pattern for a data bit period is configured such that the first coded data stream comprises systematic symbols of the data stream and, based on a code rate, one or more redundancy symbols from a first constituent encoder and a second constituent encoder of a first turbo encoder,
   wherein the second turbo encoded puncture pattern for the data bit period is configured such that the second coded data stream comprises interleaved systematic symbols of the data stream and, based on the code rate, one or more redundancy symbols from a first constituent encoder and a second constituent encoder of a second turbo encoder, the interleaved systematic symbols interleaved by an interleaver of the second turbo encoder,
   wherein the second turbo encoded puncture pattern for the data bit period is according to the table

|  | Code Rate | | |
| --- | --- | --- | --- |
| Output | 1/2 | 1/3 | 2/3 |
| X | 00 | 00 | 0000 |
| $Y_0$ | 01 | 11 | 0001 |
| $Y_1$ | 00 | 00 | 0000 |
| X' | 11 | 11 | 1111 |
| $Y_0'$ | 10 | 11 | 1000 |
| $Y_1'$ | 00 | 00 | 0000, | wherein the second turbo encoded puncture pattern for a tail bit period is according to the table

|  | Code Rate | | |
| --- | --- | --- | --- |
| Output | 1/2 | 1/3 | 2/3 |
| X | 000 111 | 000 111 | 000 111 |
| $Y_0$ | 000 1111 | 000 111 | 000 101 |
| $Y_1$ | 000 000 | 000 000 | 000 000 |
| X' | 111 000 | 111 000 | 111 000 |
| $Y_0'$ | 111 000 | 111 000 | 101 000 |
| $Y_1'$ | 000 000 | 000 000 | 000 000, | wherein X, $Y_0$, $Y_1$, X', $Y_0'$ and $Y_1'$ denote outputs of the second turbo encoder for each bit period, X output first, and wherein the first constituent encoder and the second constituent encoder of the second turbo encoder are clocked once for each data bit period and clocked once for each of three tail bit periods.

14. The system of claim 13, further comprising:
   a controller for differentiating the data stream into at least a first layer data stream and a second layer data stream,
   wherein the first layer data stream is channel coded using the first turbo encoded puncture pattern and the second turbo encoded puncture pattern, and the second layer data stream is channel coded using the first turbo encoded puncture pattern and the second turbo encoded puncture pattern.

15. The system of claim 14, wherein the first layer data stream is an enhancement layer data stream and the second layer data stream is a base layer data stream.

16. The system of claim 14, wherein the first BS transmits the first layer data stream and the second layer data stream channel coded using the first turbo encoded puncture pattern.

17. The system of claim 14, wherein the second BS transmits the first layer data stream and the second layer data stream channel coded using the second turbo encoded puncture pattern.

18. The system of claim 13, wherein the first BS and the second BS broadcast the same data stream at the same time and the same logical channel.

19. The system of claim 13, wherein the data stream includes a flow description message comprising a transmit mode extension field.

20. The system of claim 13, wherein the data stream is transmitted along with a flow description message comprising a transmit mode extension field.

21. The system of claim 13, wherein the data stream includes a system parameters message comprising a control channel transmit mode extension field.

22. The system of claim 13, wherein the data stream is transmitted along with a system parameters message comprising a control channel transmit mode extension field.

23. The system of claim 13, wherein transmit modes for transmitting the data stream comprise:
    16-QAM modulation and a turbo code rate of 1/3;
    QPSK modulation and a turbo code rate of 1/5;
    layered modulation with energy ratio 4 and a turbo code rate of 1/3; and
    layered modulation with energy ratio 6.25 and a turbo code rate of 1/3.

24. The system of claim 13, wherein transmit modes related to the second turbo encoded puncture pattern for transmitting the data stream comprise:
    QPSK modulation and a turbo code rate of 1/3;
    QPSK modulation and a turbo code rate of 1/2;
    16-QAM modulation and a turbo code rate of 1/3;
    16-QAM modulation and a turbo code rate of 1/2;
    16-QAM modulation and a turbo code rate of 2/3;
    QPSK modulation and a turbo code rate of 1/5;
    layered modulation with energy ratio 4 and a turbo code rate of 1/3;
    layered modulation with energy ratio 4 and a turbo code rate of 1/2;
    layered modulation with energy ratio 4 and a turbo code rate of 2/3;
    layered modulation with energy ratio 6.25 and a turbo code rate of 1/3;
    layered modulation with energy ratio 6.25 and a turbo code rate of 1/2; and
    layered modulation with energy ratio 6.25 and a turbo code rate of 2/3.

* * * * *